(12) United States Patent
Matsuyama et al.

(10) Patent No.: US 9,339,907 B2
(45) Date of Patent: May 17, 2016

(54) CHIP DISPOSAL DEVICE OF MACHINE TOOL

(71) Applicant: DMG MORI SEIKI CO., LTD., Nara (JP)

(72) Inventors: Tomoyoshi Matsuyama, Iga (JP); Masahide Kakutani, Nabari (JP); Yuhei Kitade, Iga (JP); Ryutaro Oshima, Iga (JP); Takuya Kichibayashi, Iga (JP)

(73) Assignee: DMG MORI SEIKI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 14/316,272

(22) Filed: Jun. 26, 2014

(65) Prior Publication Data

US 2015/0023752 A1    Jan. 22, 2015

(30) Foreign Application Priority Data

Jun. 26, 2013    (JP) .................................. 2013-133764

(51) Int. Cl.
| | |
|---|---|
| *B01D 33/04* | (2006.01) |
| *B65G 45/14* | (2006.01) |
| *B65G 45/22* | (2006.01) |
| *B23Q 11/00* | (2006.01) |

(Continued)

(52) U.S. Cl.
CPC ........ *B23Q 11/0067* (2013.01); *B23Q 11/0057* (2013.01); *B23Q 11/1069* (2013.01); *B01D 33/04* (2013.01); *B01D 43/00* (2013.01); *Y02P 70/171* (2015.11); *Y10T 409/304088* (2015.01)

(58) Field of Classification Search
CPC ..................................................... B65G 11/20
USPC .......... 198/493, 495, 716; 210/298, 400, 772, 210/783
See application file for complete search history.

(56) References Cited

U.S. PATENT DOCUMENTS

| | | | | |
|---|---|---|---|---|
| 5,078,256 | A | * | 1/1992 | Hatano et al. ................. 198/360 |
| 5,167,839 | A | * | 12/1992 | Widmer et al. ............... 210/784 |
| 5,586,848 | A | * | 12/1996 | Suwijn .......................... 409/137 |

(Continued)

FOREIGN PATENT DOCUMENTS

| | | |
|---|---|---|
| JP | S58-128851 U | 8/1983 |
| JP | H06-247523 A | 9/1994 |

(Continued)

OTHER PUBLICATIONS

European Search Report issued in corresponding EP Application No. 14173719.

*Primary Examiner* — Douglas Hess

(57) ABSTRACT

To provide a chip disposal device of a machine tool which surely separates and collects a cutting fluid adhering to a chip lump, thereby capable of reducing an amount of the cutting fluid discharged to the outside of the machine. The chip disposal device includes a liquid separating part 65 which separates and collects a cutting fluid adhering to chips, the liquid separating part 65 has a mounting part 66 which is provided continuously from an inclined discharge surface 20*a* and is inclined so as to get lower as it goes more apart outward from the inclined discharge surface 20*a*, and to which a first chip lump a1 conveyed by a first scraping plate 36*a* is transferred. Then, the first chip lump a1 on the mounting part 66 stays on the mounting part 66 until dropping by being pushed by a second chip lump a2 conveyed by a second scraping plate 36*b* following the first scraping plate 36*a*.

6 Claims, 5 Drawing Sheets

(51) Int. Cl.
  *B23Q 11/10*   (2006.01)
  *B01D 43/00*   (2006.01)

(56) References Cited

U.S. PATENT DOCUMENTS

| | | | |
|---|---|---|---|
| 5,603,846 A | * | 2/1997 | Uchiyama et al. ............ 210/784 |
| 5,961,847 A | * | 10/1999 | Creps et al. .................. 210/783 |
| 5,992,642 A | * | 11/1999 | Ota .............................. 210/396 |
| 6,066,255 A | * | 5/2000 | Anderson ..................... 210/297 |
| 6,332,983 B1 | * | 12/2001 | Tashiro et al. ................ 210/297 |
| 6,357,576 B1 | * | 3/2002 | Enomoto ...................... 198/495 |
| 6,601,691 B1 | * | 8/2003 | Enomoto ...................... 198/495 |
| 6,899,807 B2 | * | 5/2005 | Cummings ..................... 210/97 |
| 7,364,032 B2 | * | 4/2008 | Nisiguchi ..................... 198/495 |
| 7,410,569 B1 | * | 8/2008 | Tilev et al. ................ 210/167.02 |
| 8,029,670 B2 | * | 10/2011 | Dietenhauser et al. ....... 210/236 |

FOREIGN PATENT DOCUMENTS

| | | |
|---|---|---|
| JP | 2002-263984 A | 9/2002 |
| JP | 3359014 | 10/2002 |
| JP | 2002-361539 A | 12/2002 |

\* cited by examiner

CHIP DISPOSAL DEVICE OF MACHINE TOOL

BACKGROUND OF THE INVENTION

1. Field of the Invention

The present invention relates to a chip disposal device of a machine tool which discharges chips produced by machining of a workpiece to the outside of the machine.

2. Description of the Related Art

A conventional chip disposal device of this type has a problem that a cutting fluid (coolant) supplied to a machining part of a workpiece is discharged out of the machine together with chips, which has given rise to a demand for a reduction of an amount of the cutting fluid discharged to the outside of the machine. For example, in Japanese Patent 3359014, chips conveyed by a conveyor are dropped onto an inclined surface inclined from a vertical plane by about 30 degrees, and the cutting fluid adhering to the chips is separated by the collision at the time of the dropping and is collected.

However, if the chips are only dropped from the conveyor to collide with the inclined surface as in the aforesaid conventional device, there is a possibility that the cutting fluid is not sufficiently separated and the cutting fluid is discharged while remaining on the chips, which has a problem of a low collection rate of the cutting fluid.

Especially when the chips are in a lump form in which chips are entangled, the cutting fluid adheres to the chips in large amount and is not easily separated, and therefore in a case of a machine tool in which chips of this type are produced, it is required to improve a separation structure of the cutting fluid so that its discharge amount to the outside of the machine can be more reduced.

The present invention was made in view of the aforesaid conventional circumstances and has an object to provide a chip disposal device of a machine tool which surely separates and collects a cutting fluid adhering to chips, thereby capable of reducing a discharge amount of the cutting fluid to the outside of the machine.

SUMMARY OF THE INVENTION

The present invention is a chip disposal device of a machine tool, the chip disposal device including: a device casing having a storage tank to/in which chips and a cutting fluid are dropped and stored; a chip conveyor which has a pair of endless driving members moving round inside and outside the storage tank and scraping plates disposed between the driving members at an interval in a moving direction and which discharges the chips from the inside of the storage tank to the outside of the storage tank along an inclined discharge surface of the device casing; and a liquid separating part which is provided on a portion, of the inclined discharge surface, above a liquid level of the storage tank to separate and collect the cutting fluid adhering to the chips, wherein the liquid separating part has a mounting part which is provided continuously from the inclined discharge surface and is inclined so that a portion thereof more apart outward from the inclined discharge surface gets lower and to which a first chip lump conveyed by the first scraping plate is transferred, and wherein the first chip lump on the mounting part stays on the mounting part until dropping by being pushed by at least one second chip lump conveyed by at least one second scraping plate which follows the first scraping plate, and while the chip lump stays, the cutting fluid adhering to the chips is separated and collected.

In the chip disposal device according to the present invention, the liquid separating part has the mounting part which continues from the inclined discharge surface and gets lower as it goes more apart outward from the inclined discharge surface, and the first chip lump conveyed onto the mounting part by the first scraping plate stays on the mounting part until it drops by being pushed by at least one second chip lump conveyed by at least one second scraping plate following the first scraping plate. Therefore, while the chip lump stays on the mounting part, the cutting fluid adhering to the chip lump is separated. This naturally means that a larger amount of the cutting fluid adhering to the chip lump is separated and collected as the chip lump stays longer. In this manner, a collection rate of the cutting fluid can be increased.

In a suitable embodiment of the present invention, the liquid separating part has a folded portion continuous from the mounting part and folded back so as to be located under the mounting part, and the separated cutting fluid flows down on the folded portion to be collected on the inclined discharge surface side.

In the above-described suitable embodiment, since the folded portion continuous from the mounting part and folded back downward is formed, the separated cutting fluid flows toward the inclined discharge surface down on the folded portion due to its surface tension to be collected. With such a simple structure, it is possible to automatically collect the separated cutting fluid in the inside of the machine.

In another suitable embodiment of the present invention, the liquid separating part has a plurality of sets of the mounting part and the folded portion in a stepped form, and the chip lump stays and then moves sequentially on the mounting parts in the stepped form.

In the above-described suitable embodiment, the plural sets of the mounting part and the folded portion are provided in the stepped form and the chip lump stays and then moves sequentially on the mounting parts. Consequently, it is possible to greatly increase the total residence time of the chip lump on the mounting parts, which enables surer separation and collection of the cutting fluid, making it possible to increase a collection amount of the cutting fluid.

DETAILED DESCRIPTION OF THE PREFERRED EMBODIMENT

Hereinafter, an embodiment of the present invention will be described based on the attached drawings.

FIG. 1 to FIG. 5 are explanatory views of a chip disposal device of a machine tool according to the embodiment of the present invention. Front and rear, and left and right mentioned in this embodiment mean front and rear, and left and right in a state seen from a machine front.

Figure 1:
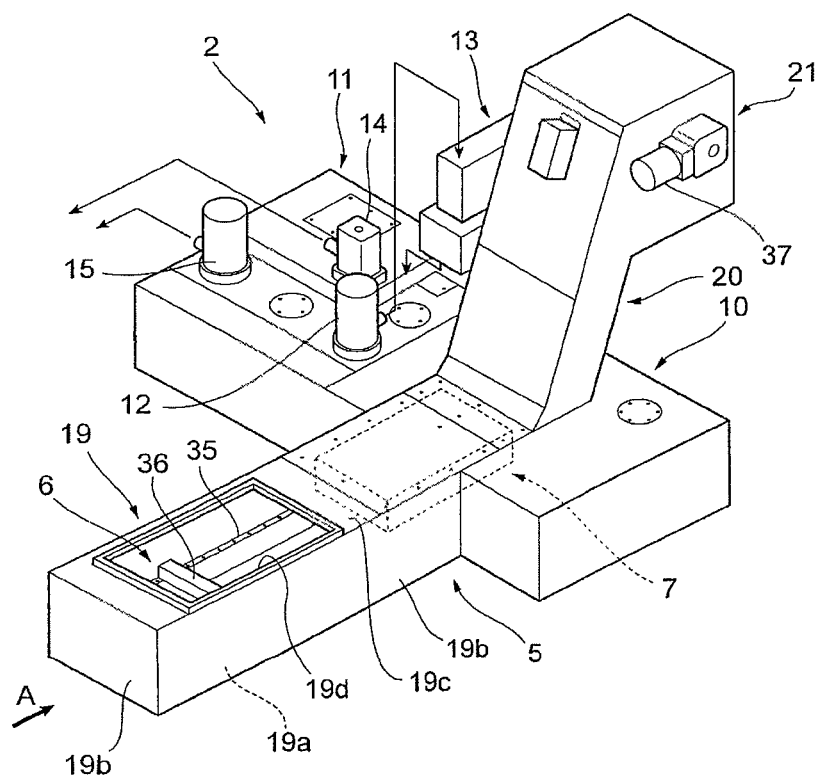
FIG. 1 is a general perspective view of a chip disposal device of a machine tool according to an embodiment of the present invention.
Figure 2:
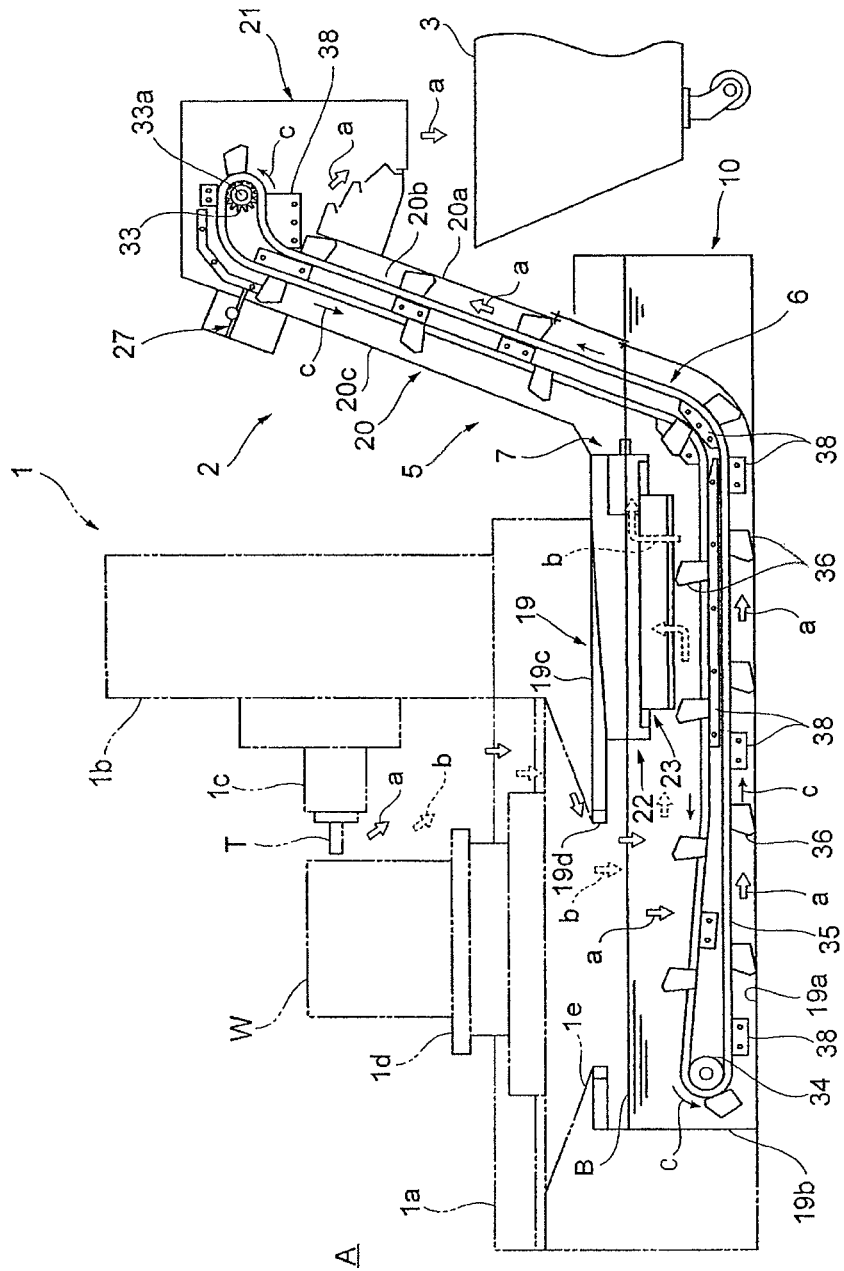
FIG. 2 is a side sectional view of the chip disposal device.
Figure 3:
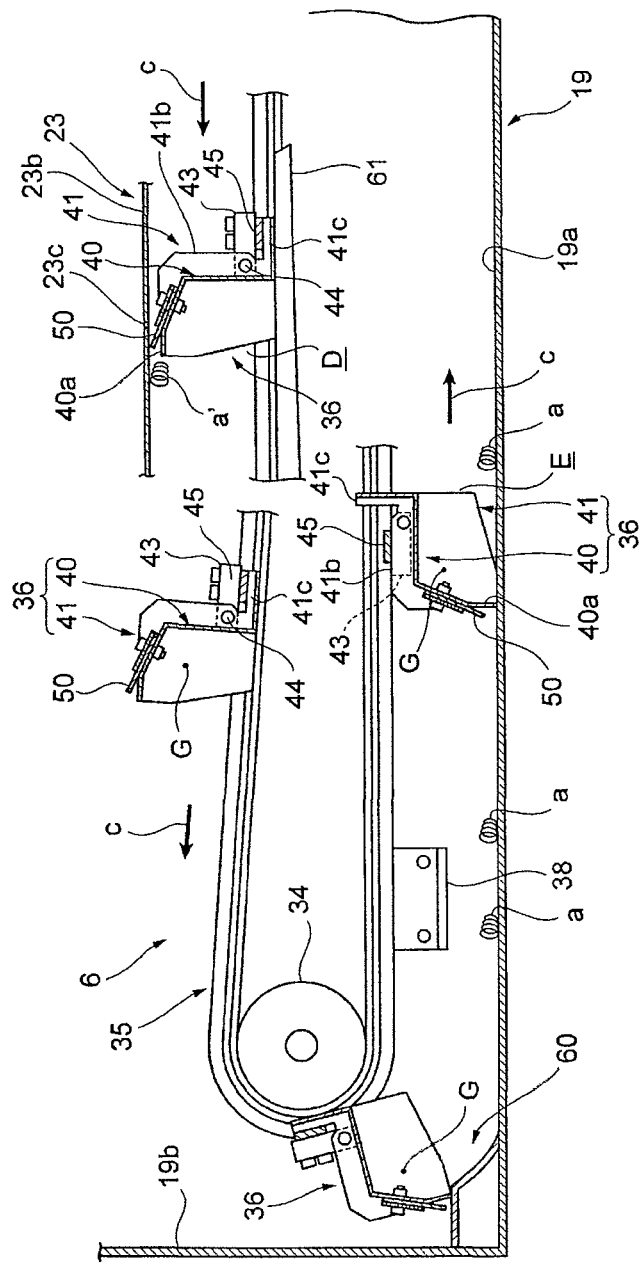
FIG. 3 is a side sectional view of a chip conveyor of the chip disposal device.
Figure 4:
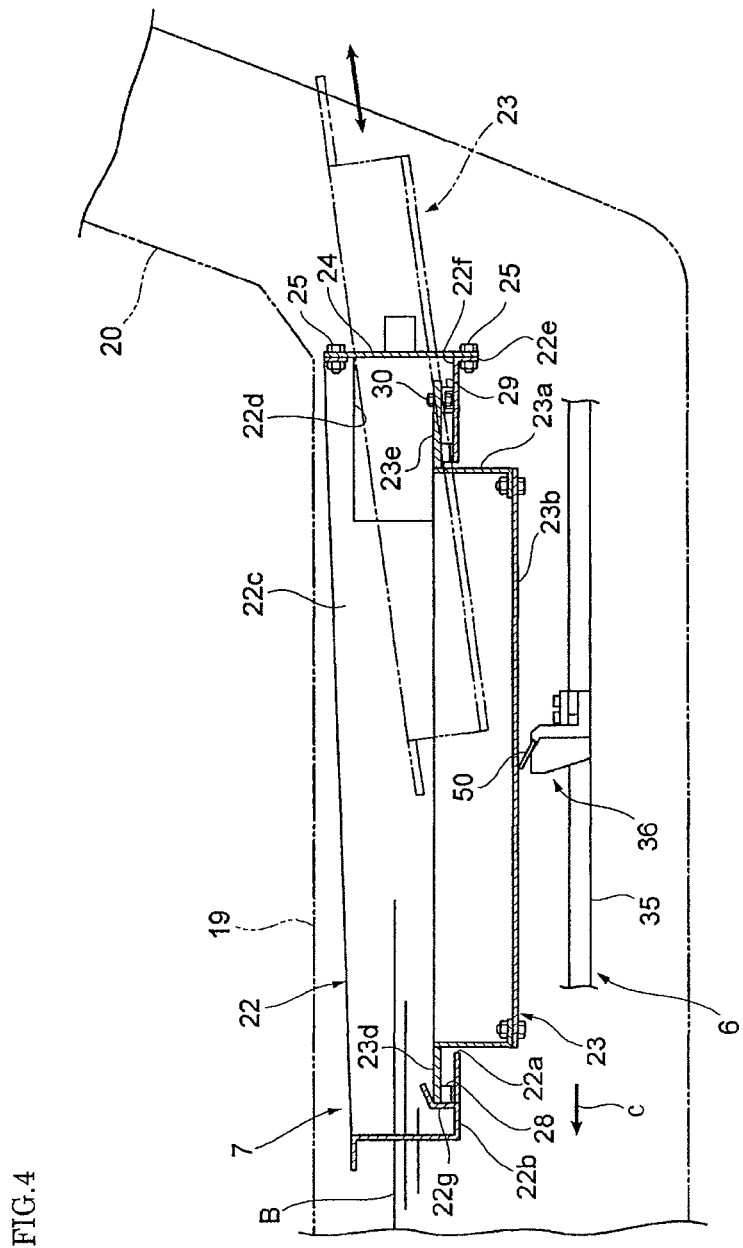
FIG. 4 is a cross-sectional view of a filtering device of the chip disposal device.

In the drawings, 1 denotes a horizontal machining center as an example of a machine tool including a chip disposal device 2 of this embodiment (refer to FIG. 2).

This horizontal machining center 1 has: a column 1b disposed on a rear side of a bed 1a when seen from the machine front A; a spindle device 1c mounted on the column 1b; and a machining table 1d disposed on a center portion of the bed 1a, and applies a predetermined cutting work to a workpiece W mounted on the machining table 1d by a cutting tool T loaded to the spindle device 1c.

Under the machining table 1d of the bed 1a, a collection concave portion 1e collecting chips a produced by the cutting work of the workpiece W and a cutting fluid (coolant) b supplied to the cutting tool T from the spindle device 1c is formed.

The chip disposal device 2 stores the chips a and the cutting fluid b dropped from the collection concave portion 1e, discharges the chips a to a chip bucket 3 provided outside the machine while separating and removing the chips a from the cutting fluid b, and also filters the cutting fluid b to circulate and supply it to the spindle device 1c.

The chip disposal device 2 mainly includes: a device casing 5 having a storage tank 19 to/in which the chips a and the cutting fluid b are dropped and stored; a chip conveyor 6 moving round anticlockwise (arrow c direction) so as to pass inside the storage tank 19; and a filtering device 7 disposed in the storage tank 19.

The device casing 5 has a primary clean tank 10 and a secondary clean tank 11 which are disposed so as to surround a rear portion of the storage tank 19 when seen from the machine front A. The cutting fluid transferred from the storage tank 19 to the primary clean tank 10 is transferred to a cyclone filter (not illustrated) via a pump 12 for cyclone filter, the cyclone filter separates the chips in a particulate form from the cutting fluid, and after transferred to a bubble removing tank 13 to be got rid of bubbles, the cutting fluid from which the chips are separated is transferred to the secondary clean tank 11 and is supplied from the secondary clean tank 11 to the spindle device 1c again by a pump 14 for spindle coolant. Meanwhile, the cutting fluid transferred to the primary clean tank 10 is supplied to machining places and so on by a pump 5 for shower.

The storage tank 19 is disposed under the collection concave portion 1e in the bed 1a, and a conveyance duct 20 is formed on a rear end of the storage tank 19 so as to rise rear obliquely upward. Furthermore, a discharge duct 21 is formed on an upper end portion of the conveyance duct 20 so as to bend and extend downward. The chip bucket 3 is disposed under the discharge duct 21.

The storage tank 19 has a rectangular box shape and has a bottom wall portion 19a being a substantially flat surface, sidewall portions 19b standing along peripheral edges of the bottom wall portion 19a, and a ceiling wall portion 19c disposed between upper end portions of the sidewall portions 19b. An opening 19d is formed in front of the ceiling wall portion 19c, and the collection concave portion 1e communicates and connects with the opening 19d.

The conveyance duct 20 has a rear wall portion 20a, sidewall portions 20b, and a front wall portion 20c which extend obliquely upward continuously from the bottom wall portion 19a, the sidewall portions 19b, and the ceiling wall portion 19c of the storage tank 19.

The chip conveyor 6 has: a pair of left and right drive sprockets 33, 33 disposed at a boundary portion between the conveyance duct 20 and the discharge duct 21; a pair of left and right driven sprockets 34, 34 disposed on front end portions in the storage tank 19; left and right endless conveyor chains (driving members) 35, 35 wound around the left and right driven sprockets 34, 34 and the left and right drive sprockets 33, 33 respectively; and many scraping plates 36 fixedly disposed between the left and right conveyor chains 35, 35 at predetermined intervals in the moving direction c.

The left and right drive sprockets 33 are driven to rotate by a drive motor 37 (refer to FIG. 1) via a drive shaft 33a to which the both sprockets 33, 33 are fixed.

Further, in the device casing 5, a limit switch 27 is disposed so as to be located near the drive sprockets 33. When the scraping plate 36 passes through the limit switch 27, the limit switch 27 is driven to turn by the scraping plate 36, thereby operating to detect a passage timing of the scraping plate 36.

The left and right conveyor chains 35, 35 are of an S roller type whose movement in a lateral direction perpendicular to the moving direction c is restricted, and are guided by guide members 38 disposed at appropriate is places, so as to move along the storage tank 19 and the conveyance duct 20.

Each of the scraping plates 36 is made of a sheet metal and has a scraping plate main body 40 formed in a bucket shape whose cross section has a substantially L-shape and left and right side plate portions 41, 41 fixed to left and right end surfaces of the scraping plate main body 40. The scraping plates 36 are each structured so as to have rigidity high enough to scrape out the chips a sinking in a bottom portion of the storage tank 19.

The scraping plates 36 are each provided with a scraper 50. The scraper 50 is formed of a thin sheet made of elastically deformable spring steel and is fixed to the scraping plate main body 40.

The scraping plates 36 are each supported so as to be rotatable around rotary shafts 44, 44 which are disposed on the left and right conveyor chains 35 via a supporting member 43, with a center of gravity G thereof being located on a more front side than the rotary shafts 44 in terms of the moving direction c of the conveyor chains 35. Further, under the supporting member 43, a stopper plate 45 in a band plate shape is disposed over the left and right conveyor chains 35, 35.

When moving in an upper portion of the storage tank 19, the scraping plates 36 are each kept in an upward-facing posture D where abutting portions 41c of the left and right side plate portions 41 abut on the stopper plate 45 and come slidably in contact with a guide member 61, whereby the scraper 50 moves while scraping a lower surface of a later-described filter main body 23 of the filtering device 7. Further, when moving in a lower portion of the storage tank 19, the scraping plate 36 is kept in a downward-facing posture E where it is turned clockwise by a guide member 61 provided on the bottom portion of the storage tank 19 and rear surface portions 41b of the left and right plate portions 41 abut on the stopper plate 45, whereby a tip portion 40a of the scraping plate main body 40 moves while scraping the bottom wall portion 19a of the storage tank 19.

The filtering device 7 has: a filter tank (filter frame body) 22 disposed near a liquid level B of the rear portion of the storage tank 19 and having a lower end opening 22a from which the cutting fluid flows in; and the filter main body 23 attachably/detachably provided in the lower end opening 22a and removing the chips from the flowing cutting fluid.

The filter tank 22 has a rectangular box shape and is fixed to the storage tank 19. The lower end opening 22a is formed in a bottom plate 22b of the filter tank 22. On a peripheral edge portion of the lower end opening 22a of the bottom plate 22b, a seal member 28 sealing a gap between the lower end opening 22a and the filter main body 23 is disposed.

Further, in a left side plate 22c of the filter tank 22, a communication hole 22d communicating with the primary clean tank 10 is formed, and the cutting fluid filtered by the filter main body 23 flows into the primary clean tank 10 via the communication hole 22d. As a result, a water level of the cutting fluid in the storage tank 19 is kept at the predetermine water level B corresponding to a height of the communication hole 22.

The filter main body 23 has: a frame member 23a in a rectangular frame shape open upward and downward; and a filter plate 23b attachably/detachably bolt-fixed to a lower surface of the frame member 23a. In the filter plate 23b, many micropores 23c are formed, and a size of each of the micropores 23c is set so as to allow the passage of only the cutting fluid and prevent the passage of the chips.

A flange portion is formed around an edge portion of an upper end opening of the frame member 23a, and a front side portion of the flange portion is an engaging portion 23d, and its rear side portion is a grip portion 23e.

The engaging portion 23d is engaged with an engaging piece 22g formed upright on a front end portion of the bottom plate 22b of the filter tank 22, so as to sandwich the seal member 28. Further, the grip portion 23e is attachably/detachably fixed to a bracket 29 attached to a rear end portion of the bottom plate 22b, by a bolt 30.

In a rear plate 22e of the filter tank 22, a maintenance opening 22f is formed with a shape and a size enabling to take out the filter main body 23. Further, a cover plate 24 capable of opening/closing the maintenance opening 22f is attachably/detachably attached to the rear plate 22e by a plurality of bolts 25a.

The chip disposal device 2 includes a liquid separating part 65 which separates and collects the cutting fluid adhering to the chip lumps discharged from the aforesaid storage tank 19 by the chip conveyor 6. The liquid separating part 65 is provided continuously from an upper end portion of an inclined discharge surface 20a of the conveyance duct 20 extending obliquely upward from the storage tank 19 and in detail, has the following structure.

The conveyance duct 20 has a rectangular cylindrical shape, and when each of the scraping plates 36 moves up while abutting on or approaching the inclined discharge surface 20a of the conveyance duct 20, the chip lump collected in a bucket portion 42 of the scraping plate 36 is pushed up.

The left and right conveyor chains 35 in the conveyance duct 20 extend from an upper end opening 20b of the conveyance duct 20 substantially horizontally into the discharge duct 21. When the scraping plate 36 reaches the upper end opening 20b, the chip lump in the bucket portion 42 starts to be transferred toward the liquid separating part 65, and when the scraping plate 36 reaches horizontal portions 35a of the conveyor chains 35, the bucket portion 42 of the scraping plate 36 faces downward, so that the chip lump a in the bucket portion 42 is completely transferred to the liquid separating part 65.

The liquid separating part 65 has a structure in which an upper mounting part 66 which continues from the upper end of the inclined discharge surface 20a of the conveyance duct 20 and is disposed in an inclined manner so as to get lower as it goes more apart outward, a middle mounting part 67 disposed under the upper mounting part 66 so as to be inclined more than the upper mounting part 66, and a lower mounting part 68 disposed under the middle mounting part 67 so as to be still more inclined than the middle mounting part 67 are disposed in a stepped form.

The upper, middle, and lower mounting parts 66 to 68 have folded portions 70, 71, 72 continuous from outer edges of the mounting parts 66 to 68 and folded back downward. The folded portions 70 to 72 have: vertical side portions 70a to 72a continuous from the outer edges of the mounting parts 66 to 68 and bent substantially vertically downward; and collection side portions 70b to 72b which are continuous from lower edges of the vertical side portions 70a to 72a and are bent and extend inward so as to be located under the mounting parts 66 to 68.

The middle mounting part 67 is disposed so that its upper edge is located under and at a predetermined interval from the collection side portion 70b of the folded portion 70 of the upper mounting part 66. The lower mounting part 68 is disposed so that its upper edge is located under and at a predetermined interval from the collection side portion 71b of the middle mounting part 67. Further, on the folded portion 72 of the lower mounting part 68, a lower side portion 72c continuous from its collection side portion 72b to extend downward is formed.

The liquid separating part 65 has: a collection passage portion 73 disposed so as to be located under the mounting parts 66 to 68 and inclined obliquely downward; and a return passage portion 74 inclined inward from an outer edge portion of the collection passage portion 73 and communicating with the inside of the conveyance duct 20.

On an outer edge portion of the collection passage portion 73, a weir portion 73a separating a part to which the chip lump drops and a part to which the cutting fluid drops from each other is formed, and the weir portion 73a is disposed on an outer side of the lower side portion 72c of the folded portion 72 of the lower mounting part 68.

An inclination angle $\theta$ of the upper mounting part 66 is set to such an angle that the chip lump transferred from the scraping plate 36 stays without easily sliding down due to its own weight. In this embodiment, this angle is set to about 20 degrees relative to a horizontal plane C.

Further, as described above, an inclination angle of the middle mounting part 67 is set to a value larger than the inclination angle of the upper mounting part 66, and an inclination angle of the lower mounting part 68 is set to a value larger than the inclination angle of the middle mounting part 67. That is, the inclination angle of the middle mounting part 67 is set so that the chip lump transferred thereto slightly slides due to its own weight while staying on the mounting part 67, and the inclination angle of the lower mounting part 68 is set so that the chip lump transferred thereto gradually slides down due to its own weight while staying on the mounting part 68.

Consequently, the chip lump a transferred from the scraping plate 36 stays and then moves sequentially on the upper, middle, and lower mounting parts 66 to 68.

Figure 5:
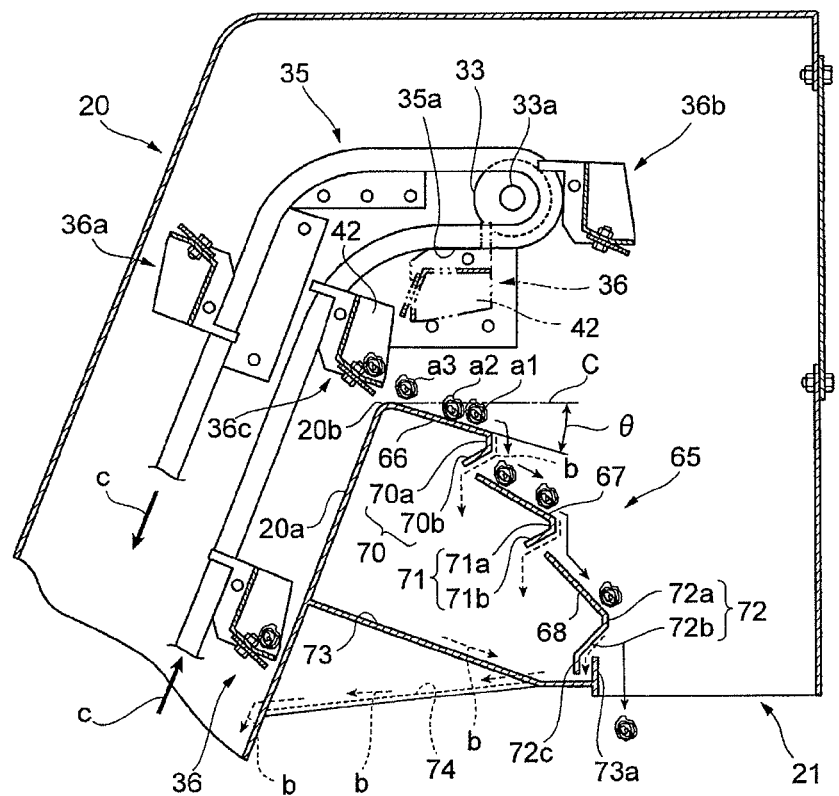
FIG. 5 is a cross-sectional view of a liquid separating part of the chip disposal device.

In the device of this embodiment, the cutting fluid adhering to the chip lump is mostly separated due to its own weight when moving up in the conveyance duct 20 from the storage tank 19, and the rest of the cutting fluid is separated in the liquid separating part 65 as illustrated in FIG. 5. Note that FIG. 5 illustrates a state where first to third chip lumps a1 to a3 are transferred to the upper mounting part 66.

First, when the first chip lump a1 conveyed by the first scraping plate 36a is transferred to the upper mounting part 66, the first chip lump a1 stays on the upper mounting part 66 until it drops onto the middle mounting part 67 by being pushed by the second chip lump a2 conveyed by the second scraping plate 36b following the first scraping plate 36a or the third chip lump a3 sequentially conveyed by the third scraping plate 36c following the second scraping plate 36b.

The chip lump a dropping to the middle mounting part 67 stays and then slowly slides due to its own weight on the mounting part 67, and then drops to the lower mounting part 68 by being pushed by the chip lump that next drops to the mounting part 67. The chip lump dropping to the lower mounting part 67 stays and then slides on the mounting part 67 and then drops to be collected from the discharge duct 21 to the aforesaid chip bucket 3.

While the first to third chip lumps a1 to a3 stay on the upper mounting part 66, the cutting fluid b adhering to the chip lumps a1 to a3 is separated to flow down from the mounting part 66 to the collection passage portion 73 through the folded portion 70, and from here, is returned to the inside of the conveyance duct 20 via the return passage portion 74, and flows down the inclined discharge surface 20a to be collected in the storage tank 19.

Further, similarly to the above, while the chip lump b dropping to the middle and lower mounting parts 67, 68 stay on the mounting parts 67, 68, the cutting fluid left on the chip lump is separated and flows down to the collection passage portion 73 through the folded portions 71, 72, and from here is returned to the inside of the conveyance duct 20 via the return passage portion 74.

As described above, in this embodiment, the upper mounting part 66 which is inclined so as to get lower as it goes more apart outward is provided in the liquid separating part 65 provided continuously from the inclined discharge surface 20a of the conveyance duct 20, and the first chip lump a1 conveyed to the upper mounting part 66 by the first scraping plate 36a stays on the mounting part 66 until it drops by being pushed by at least second and third chip lumps a2, a3 conveyed by at least the second and third scraping plates 36b, 36c following the first scraping plate 36a. Therefore, the cutting fluid b adhering to the chip lumps a1 to a3 is separated and collected while they stay on the mounting part 66, which can accordingly increase a collection rate of the cutting fluid b, leading to a great reduction of an amount of the cutting fluid b discharged to the outside of the machine.

Further, in this embodiment, the upper, middle, and lower mounting parts 66 to 68 are provided in the stepped form, and the chip lump stays and then moves sequentially on the mounting parts 66 to 68. Consequently, it is possible to greatly increase the staying time of the chip lump on the mounting parts 66 to 68, which accordingly enables surer separation and collection of the cutting fluid, leading to an increase of a collection amount of the cutting fluid.

Furthermore, in this embodiment, the folded portions 70 to 72 to continuous from the upper to lower mounting parts 66 to 68 and folded downward are formed on the mounting parts 66 to 68, and the cutting fluid b flowing along the folded portions 70 to 72 to be separated is collected on the inclined discharge surface 20a side. Therefore, with a simple structure, it is possible to automatically return the separated cutting fluid b to the storage tank 19.

Incidentally, in this embodiment, the mounting parts form the three steps, but the mounting parts of the present invention are not limited to these, and one step, two steps, or four steps or more of the mounting parts may be provided, and the number of steps is appropriately set according to an adhesion amount of the cutting fluid and so on.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A chip disposal device of a machine tool, the chip disposal device comprising:
   a device casing having a storage tank to/in which chips and a cutting fluid are dropped and stored;
   a chip conveyor which has a pair of endless driving members moving round inside and outside the storage tank and scraping plates disposed between the driving members at an interval in a moving direction and which discharges the chips from the inside of the storage tank to the outside of the storage tank along an inclined discharge surface of the device casing; and
   a liquid separating part which is provided on a portion, of the inclined discharge surface, above a liquid level of the storage tank to separate and collect the cutting fluid adhering to the chips,
   wherein the liquid separating part has a plurality of stages of mounting parts which are provided continuously from the inclined discharge surface, are each disposed at an inclination angle so that a portion thereof more apart outward from the inclined discharge surface get lower and to which a first chip lump conveyed by the first scraping plate is transferred, the inclination angle of the mounting part on a lower stage being set larger, and
   wherein the first chip lump on the mounting part on each of the stages stays on the mounting part on each of the stages until dropping by being pushed by at least one second chip lump conveyed by at least one second scraping plate which follows the first scraping plate, and while the chip lump stays, the cutting fluid adhering to the chips is separated and collected.

2. The chip disposal device of the machine tool according to claim 1,
   wherein the liquid separating part has a folded portion continuous from the mounting part on each of the stages and folded back so as to be located under the mounting part on each of the stages, and the separated cutting fluid moves toward the inclined discharge surface down on the folded portion.

3. A chip disposal device of a machine tool, comprising:
   a device casing including a storage tank to which and in which chips and a cutting fluid are dropped and stored, and including an inclined discharge surface;
   a chip conveyor including a pair of endless driving members moving round inside and outside the storage tank and scraping plates disposed between the driving members at an interval in a moving direction, the chip conveyor being configured to discharge a first lump of the chips from the inside of the storage tank to the outside of the storage tank along the inclined discharge surface; and
   a liquid separating part being configured on a portion of the inclined discharge surface above a level surface of the cutting fluid in the storage tank to separate the cutting fluid from the first lump,
   the liquid separating part including a first mounting part and a second mounting part being arranged separate from the first mounting part and arranged closer to the level surface than the first mounting part in a vertical direction perpendicular to the level surface,
   the first mounting part inclining at a first angle with respect to the level surface,
   the second mounting part inclining at a second angle with respect to the level surface ,
   the first angle being smaller than the second angle.

4. The chip disposal device of the machine tool according to claim 3, further comprising:
   a first folded portion extending from an end of the first mounting part in a direction towards the inclined discharge surface, wherein
   the cutting fluid is guided by the first folded portion to the storage tank, after being separated from the first lump.

5. The chip disposal device of the machine tool according to claim 3, wherein
   the first lump stays on the first mounting part until being pushed by at least a second lump of the chips conveyed subsequent to the first lump, and while the first lump stays on the first mounting part, the cutting fluid is separated from the first lump.

6. The chip disposal device of the machine tool according to claim 3, further comprising: a collection passage portion on which the cutting fluid returns to the storage tank after being separated from the first lump at the first mounting part.

* * * * *